United States Patent
Li et al.

(10) Patent No.: US 7,209,908 B2
(45) Date of Patent: Apr. 24, 2007

(54) DATA CLASSIFICATION USING STOCHASTIC KEY FEATURE GENERATION

(75) Inventors: Cong Li, Beijing (CN); Ji-Rong Wen, Beijing (CN); Hang Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 10/666,754

(22) Filed: Sep. 18, 2003

(65) Prior Publication Data

US 2005/0065899 A1 Mar. 24, 2005

(51) Int. Cl.
 *G06F 17/00* (2006.01)
 *G06N 5/00* (2006.01)
(52) U.S. Cl. .............................. 706/45; 706/12; 706/46
(58) Field of Classification Search .................. 706/45, 706/12, 46; 707/3, 1
 See application file for complete search history.

(56) References Cited

U.S. PATENT DOCUMENTS

| | | | |
|---|---|---|---|
| 7,020,642 B2 * | 3/2006 | Ferguson et al. ............. 706/21 |
| 2003/0069877 A1 * | 4/2003 | Grefenstette et al. ......... 707/2 |
| 2003/0078899 A1 * | 4/2003 | Shanahan ...................... 706/8 |
| 2004/0015462 A1 * | 1/2004 | Lienhart et al. ............... 706/45 |
| 2004/0019575 A1 * | 1/2004 | Talbot et al. .................. 706/46 |
| 2004/0024719 A1 * | 2/2004 | Adar et al. .................... 706/12 |
| 2004/0024721 A1 * | 2/2004 | Donovan et al. ............. 706/46 |
| 2006/0089924 A1 * | 4/2006 | Raskutti et al. ................ 707/1 |

OTHER PUBLICATIONS

Dragomir Radev et al, Evaluation of Text Summarization in a Cross-lingual Information Retrieval Framework, 2001, Johns Hopkins University, 1-135.*
Ting Fie et al, Question Classification for E-learning by Artifical Neural Network, 2003, IEEE, 0-7803-8185-8/03, 1757-1761.*
Dragomir Radev, Simone Teufel Horacio Saggion, Wai Lam, John Blitzer, Arda Celebi, Hong Qi, Elliot Drabek, and Danyu Liu, "Evaluation of Text Summarization in a Crosslingual Information Retrieval Framework", Summer 2001 Johns Hopkins Workshop Final Report, pp. 1-135.
Dumais, S., Platt, J., Heckerman, D., & Sahami, M. (1998). "Inductive Learning Algorithms and Representations for Text Categorization." In Proceedings of the Seventh ACM International Conference on Information and Knowledge Management, pp. 148-155.
Liu, H. & Motoda, H. (1998). "Feature Transformation and Subset Selection." IEEE Intelligent System, vol. 13, No. 2, pp. 26-28.

* cited by examiner

*Primary Examiner*—Joseph P Hirl
(74) *Attorney, Agent, or Firm*—Lee & Hayes, PLLC

(57) ABSTRACT

Data classification using stochastic key feature generation includes obtaining a set of training data having associated summaries. The set of training data and associated summaries are used to generate a key feature generation model. Another set of training data having associated categories is also obtained, and the key feature generation model is used to map this other set of training data to a set of vectors. A data classifier is then trained based on the set of vectors and the associated categories.

44 Claims, 6 Drawing Sheets

DATA CLASSIFICATION USING STOCHASTIC KEY FEATURE GENERATION

TECHNICAL FIELD

This invention relates to data classification, and more particularly to data classification using stochastic key feature generation.

BACKGROUND

Classification of data into classes or categories is an often-performed function. One example of such data classification is text classification, which can be used to automatically assign natural language texts into a number of predefined thematic categories. An example of such text classification is email classification at a help desk—email messages are received and are automatically classified into predefined categories so that they can be better responded-to by the help desk staff.

However, the performance of current classification systems can be lacking, especially in situations where the data is noisy (e.g., where the data includes portion(s) that are not useful for classification). Thus, it would be beneficial to improve the performance of classification systems, and thus improve how well data is classified by such systems.

SUMMARY

Data classification using stochastic key feature generation is described herein.

In accordance with certain aspects, a set of training data is obtained having associated summaries. The set of training data and associated summaries are used to generate a key feature generation model. Another set of training data having associated categories is also obtained, and the key feature generation model is used to map this other set of training data to a set of vectors. A data classifier is then trained based on the set of vectors and the associated categories.

BRIEF DESCRIPTION OF THE DRAWINGS

The same numbers are used throughout the document to reference like components and/or features.

DETAILED DESCRIPTION

Data classification using stochastic key feature generation is described herein. In accordance with certain aspects, a classifier is trained based on two different spaces: training data and corresponding high-level features. For example, for a text classifier, the two different spaces can be training text and associated summaries. Once trained, the classifier can be used to classify new input data into a class(es).

Figure 1:
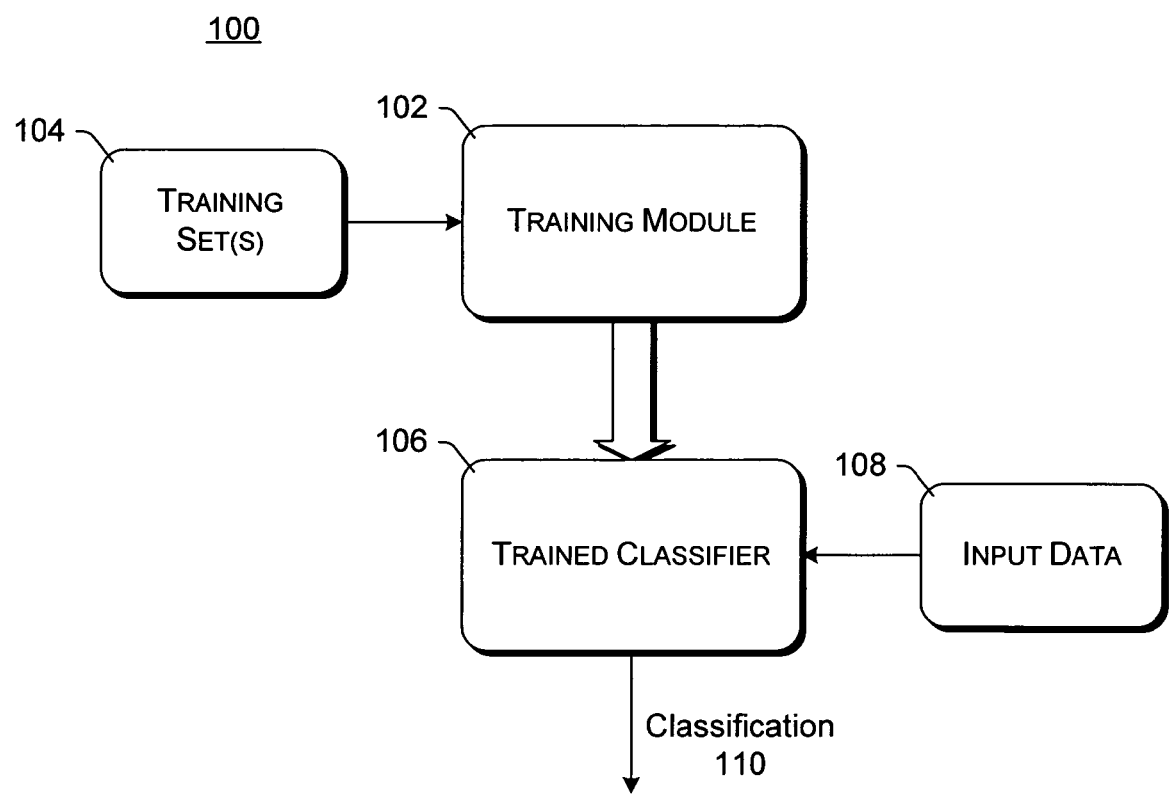
FIG. 1 illustrates an example environment employing data classification using stochastic key feature generation.

FIG. 1 illustrates an example environment 100 employing the data classification using stochastic key feature generation. Environment 100 includes a training module 102 which receives one or more training set(s) 104 that are used by training module 102 to generate a trained classifier 106. Each training set 104 includes training data and one or more high-level (or key) features associated with the training data and categories associated with the training data. Training module 102 uses the training data, the high-level (key) features associated with the training data, and the categories associated with the training data to generate trained classifier 106.

After trained classifier 106 is generated, input data 108 is received at classifier 106 for classification. Trained classifier 106 analyzes input data 108 and classifies or categorizes input data 108 into one or more classes or categories. This classification 110 is output by trained classifier 106.

Additional details regarding the generation of trained classifier 106 and the classification of input data 108 by classifier 106 are discussed below.

Figure 2:
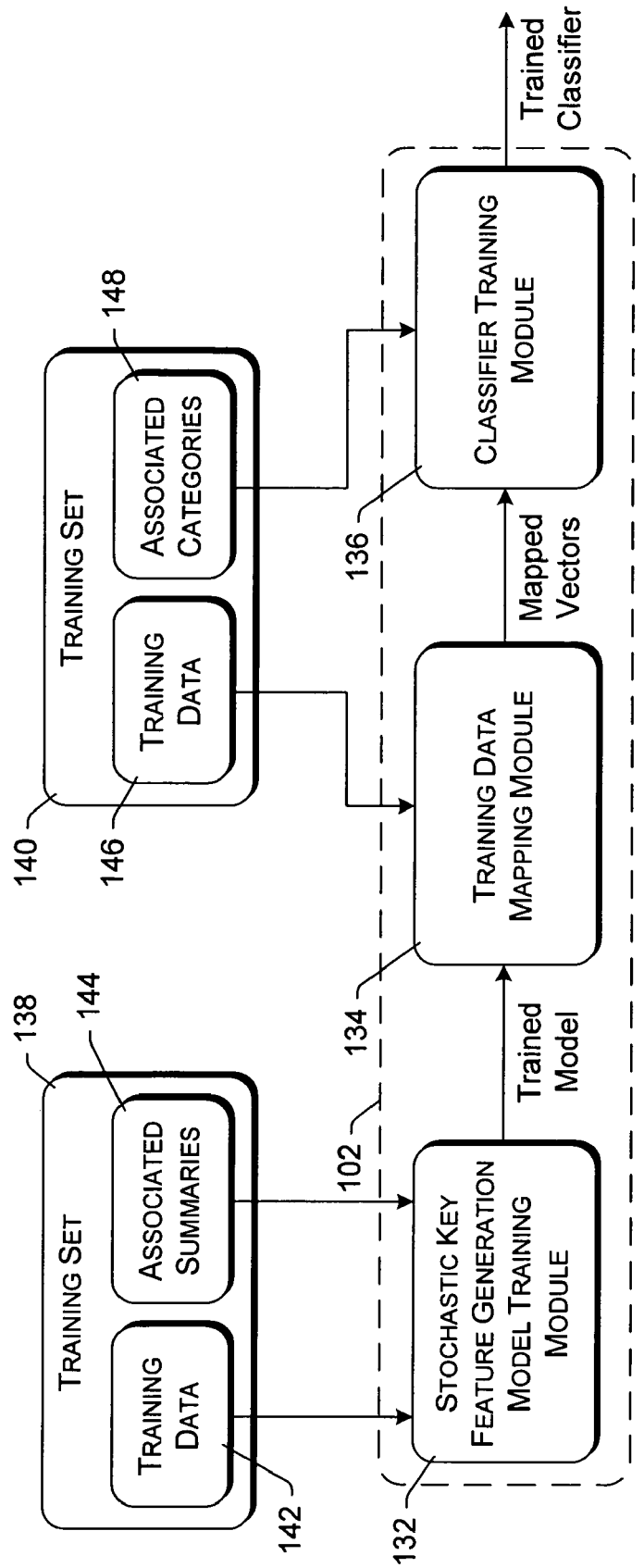
FIG. 2 illustrates an example of a training module of FIG. 1 in additional detail.

FIG. 2 illustrates an example of training module 102 of FIG. 1 in additional detail. Training module 102 includes a stochastic key feature generation model training model 132, a training data mapping module 134, and a classifier training module 136. Two training sets 138 and 140 are illustrated in FIG. 2.

Training sets 138 and 140 are used to train training module 102. Each training set 138 and 140 includes training data as well as one or more of associated summaries and associated categories. In FIG. 2, two training sets 138 and 140 are shown—training set 138 includes training data 142 and associated summaries 144, while training set 140 includes training data 146 and associated categories 148. Although illustrated as two different training sets 138 and 140, it is to be appreciated that the two training sets may be combined into a single training set. Additionally, it is to be appreciated that one or more additional training sets analogous to training sets 138 and/or 140 can be used for training and input to training module 102.

Training data 142 and training data 146 each include multiple pieces of data that are to be used in the training of training module 102. Training data 142 and training data 146 may include the same pieces of data, may include different pieces of data, or may overlap (e.g., some pieces of data may be included in both training data 142 and 146, while other pieces of data are included in only one of training data 142 or 146).

The type of data included in training data 142 or 146 is the same type of data that is to be classified by the classifier when trained (e.g., classifier 106 of is FIG. 1). For example, the data type may be text, image, video, audio, combinations thereof (e.g., web page), and so forth. By way of example, if text documents are to be classified, then training data 142 and 146 would include text pieces (e.g., each piece of text being a text document). By way of another example, if web pages were to be classified, then training data 142 and 146 would include web page pieces (e.g., each piece being an entire web page or part of a web page).

A piece of data (e.g., as included in training data 142 or 146) refers to a collection of data of a particular type(s). Each piece of data is typically the same type of collection of data as is desired to be classified by the trained classifier being created by training module 102. For example, if email messages were to be classified by the trained classifier, then each piece of data would be an email message (a collection of words). By way of another example, if conference papers were to be classified by the trained classifier, then each piece of data would be a conference paper (a collection of words). By way of yet another example, if images were to be classified by the trained classifier, then each piece of data would be an image. By way of still another example, if web pages were to be classified by the trained classifier, then each piece of data would be a web page (e.g., a collection of words and/or images).

Training set 138 also includes associated summaries 144. Associated summaries 144 include high-level (key) features associated with training data 142. The exact nature of these key features will vary based on the type of data in training data 142. For example, if training data 142 were text, then the key features would be keywords associated with the training data, and each piece of training data would have an associated group of one or more keywords. By way of another example, if training data 142 were images, then the key features would be objects (e.g., people, buildings, scenery, etc.) associated with the training data, and each piece of training data would have an associated group of one or more objects.

Associated summaries 144 can be generated in any of a variety of manners. In certain embodiments, summaries 144 are generated manually (e.g., by having a human user(s) analyze the pieces of training data 142 and identify the key features of each piece to be included in the summary associated with that piece). Alternatively, summaries 144 can be generated automatically. A discussion of example methods that can be used to automatically generate summaries can be found in Dragomir Radev, Simone Teufel Horacio Saggion, Wai Lam, John Blitzer, Arda Celebi, Hong Qi, Elliott Drabek, and Danyu Liu, "Evaluation of Text Summarization in a Cross-lingual Information Retrieval Framework", Summer 2001 Johns Hopkins Workshop Final Report.

It should be noted that a key feature included in one of the summaries 144 need not be present in the associated piece of data of training data 142. For example, if training data 142 were to be electronic mail (email) messages, and the key features were to be keywords, then a key feature for one email message may be the word "body" even though the word "body" is not present in the associated email message.

Training set 140 also includes associated categories 148. Associated categories 148 include a category or classification assigned to each piece of training data 146. Each piece of training data 146 is assigned to one or more of categories 148. The specific categories or classifications used will be those categories or classifications that the resultant trained classifier is to classify newly input data into. Any of a variety of categories or classifications can be used as desired by the designer of training module 102. In certain embodiments, the categories or classifications are manually defined (e.g., by having a human user(s) determine which categories or classifications are desirable). Alternatively, the categories or classifications can be generated automatically.

By way of example, assume that the designer desires to train a classifier to classify electronic mail (email) messages received at a help desk. The designer can define which categories he or she desires to have the email messages classified into (e.g., a set of common errors or problems encountered by users and their solutions). Multiple email messages are used as training data 146 and are assigned to particular ones of these defined categories (each of the associated categories 148 is one of these defined categories). Additionally, multiple email messages are used as training data 142 (these may be the same email messages as were used as training data 146, or alternatively may be different email messages). A summary for each of the email messages in training data 142 is included in associated summaries 144. Each of these summaries is a list of keywords for the associated email message.

Continuing with the discussion of training module 102 of FIG. 2, stochastic key feature generation model training module 132 trains a stochastic key feature generation model based on the training data 142 and key features collected from the summaries 144. The stochastic key feature generation model denotes the space of conditional probability values in key features. Once this model is trained, given any incoming data, the conditional probability of whether a key feature would occur or would not occur in a summary of the incoming data can be determined.

Stochastic key feature generation model training module 132 trains the stochastic key feature generation model by first obtaining a list of key features. The list of key features can be obtained, for example, by generating a listing of all of the features from the associated summaries 144. Module 132 can also identify, based on summaries 144, for each key feature whether the key feature occurs in the summary of one of the pieces of training data 142. For each key feature, module 132 creates a binary classifier which judges how likely the key feature occurs (or does not occur) in the summary of a particular piece of training data 142.

Reference is made herein to features and key features. Features refer to parts of the input data (e.g., training data, or data to be classified by the trained classifier as discussed in more detail below). Key features refer to parts of the associated summaries 144 (and which are used in the stochastic key feature generation model training module). For example, in the case of a piece of text, the features would be the words in the piece of text and the key features would be keywords in the summary associated with the piece of text. By way of another example, in the case of an image, the features would be low-level aspects of the image (e.g., colors, textures, etc.) and the key features would be high-level aspects of the image (e.g., people, buildings, scenery, etc.).

The stochastic key feature generation model can also be described using mathematical formulas and equations. Let $X=\{0,1\}^n$ denote a space of n features and Y denote a set of classes. Let $x=(x_1,x_2,\ldots,x_n)\in X$ denote a feature vector representing a piece of data, in which the i-th element indicates the occurrence or non-occurrence of the i-th feature in the piece of data. Let $y\in Y$ denote a class representing a category that one or more pieces of data may be classified into. Let $X=(X_1,X_2,\ldots,X_n)$ denote a random variable on X, and Y a random variable on Y.

Let $S=\{0,1\}^m$ denote another space of m key features. Let $s=(s_1,s_2,\ldots,s_m)\in S$ denote a feature vector representing a summary, in which the i-th element indicates the occurrence or non-occurrence of the i-th keyword in a summary. Let $S=(S_1,S_2,\ldots,S_m)$ denote a random variable on S.

Given a training set 138 containing training data 142 and associated summaries 144, represented as $\{(x_1,s_1), (x_2,s_2),\ldots,(x_l,s_l)\}$, stochastic key feature generation model training module 132 constructs a key feature classifier for each of the key features $(S_1,S_2,\ldots,S_m)$. These key feature classifiers are used as probabilistic models in module 132—that is, the classifiers represent a conditional probability that a particular key feature accurately represents a particular piece of training data. For example, module 132 can create a naïve Bayesian classifier (KeyFeatureClassifier) for each key feature $S_j$ as follows:

$$P(S_j = 1 \mid x) = \frac{\prod_{i=1}^{n} \hat{P}(X_i = 1 \mid S_j = 1)^{x_i} \hat{P}(S_j = 1)}{\prod_{i=1}^{n} \hat{P}(X_i = 1 \mid S_j = 1)^{x_i} \hat{P}(S_j = 1) + \prod_{i=1}^{n} \hat{P}(X_i = 1 \mid S_j = 0)^{x_i} \hat{P}(S_j = 0)}$$

where $\hat{P}(X_i=1|S_j=1)$, $\hat{P}(X_i=1|S_j=0)$, $\hat{P}(S_j=0)$ are parameters estimated from the training set 138 using maximum likelihood estimation as follows:

$$\hat{P}(S_j = v) = \frac{count(S_j = v)}{\sum_{u=0,1} count(S_j = u)},$$

$$P(X_i = 1 \mid S_j = v) = \frac{count(X_i = 1 \ \& \ S_j = v)}{\sum_{k=1}^{n} count(X_k = 1 \ \& \ S_j = v)}$$

where count( ) represents the total number of times the condition specified in the parenthetical is satisfied for the particular piece of training data.

Once the KeyFeatureClassifier classifiers are created, given a new piece of data x, module 132 can then use the naïve Bayesian key feature classifiers to calculate the conditional probability of each of the keywords:

$(P(S_1=1|x), P(S_2=1|x), \ldots, P(S_m=1|x))$.

Let θ denote the space of conditional probability values of key features, and $\theta(x)=(\theta_1(x),\theta_2(x), \ldots, \theta_m(x))$ a vector in θ, where $\theta_j(x)=P(S_j=1|x)$ (j=1, \ldots, m). This space θ, being the collection of vectors θ(x), is the stochastic key feature generation model created by module 132.

Other types of key feature classifiers could also be used rather than the naïve Bayesian classifier, such as a perceptron classifier or a support vector machine classifier. Although discussed as using a probabilistic model, stochastic key feature generation model training module 132 could use other models, such as a finite mixture model, statistical machine translation model, and so forth.

The trained stochastic key feature generation model θ is then output from module 132 to training data mapping module 134. Training data mapping module 134 uses the trained stochastic key feature generation model θ to map each piece of training data 146 into a probability vector. Each component of the probability vector corresponds to a key feature in the key feature list—the value of each component is the conditional probability of the key feature given the piece of training data 146. These conditional probability values are generated using the KeyFeatureClassifier classifiers generated above by module 132. This maps the training data 146 to a vector θ(x) of the stochastic keyword generation model.

The mapped probability vectors from training data mapping module 134 are input to classifier training module 136, along with the associated categories 148. Each of the mapped probability vectors output by training data mapping module 134 is associated with a piece of training data 146, and thus is also associated with one or more of categories 148. Classifier training module 136 uses a supervised learning algorithm to construct (or train) a classifier $h_\Theta$ using the mapped probability vectors from module 134 and their associated categories 148 as follows:

$$h_\Theta(\theta(x)) = \arg\max_y \left[ \sum_{i=1}^{m} w_{i,y}^{(s)} \theta_i(x) + b_y \right]$$

where m represents the number of key features (the number of components in the mapped probability vectors), $w_{i,y}^{(S)}$ represents the weight supporting y with the occurrence of the i-th feature in the probability vector, and $b_y$ represents the prior weight of y. The initial values for these weights can vary based on the supervised learning algorithm used. In certain implementations, using the perceptron algorithm with margins as the supervised learning algorithm, the initial weights are set to zero. The trained classifier $h_\Theta(\theta(x))$ is then output by module 136 as the trained classifier.

Any of a variety of classifiers can be trained by classifier training module 136. Examples of such classifiers include a support vector machine classifier, nearest neighbor classifier, neural network classifier, naïve Bayesian classifier, logistic regression classifier, rule-based classifier, perceptron classifier, and so forth. Each classifier has an associated learning algorithm(s) that is used to train the classifier.

In certain embodiments, classifier training module 136 employs a perceptron algorithm with margins (PAM) as the supervised learning algorithm to train the classifier. The perceptron algorithm with margins can be used to train, for is example, a perceptron classifier. An example of the supervised learning algorithm used by module 136 to train the classifier is illustrated by the pseudocode in Table I below. In the example of Table I, the values for t and X are selected empirically, or alternatively in some other (e.g., ad hoc) manner. As discussed above, the value l corresponds to the size of the training data.

Figure 3:
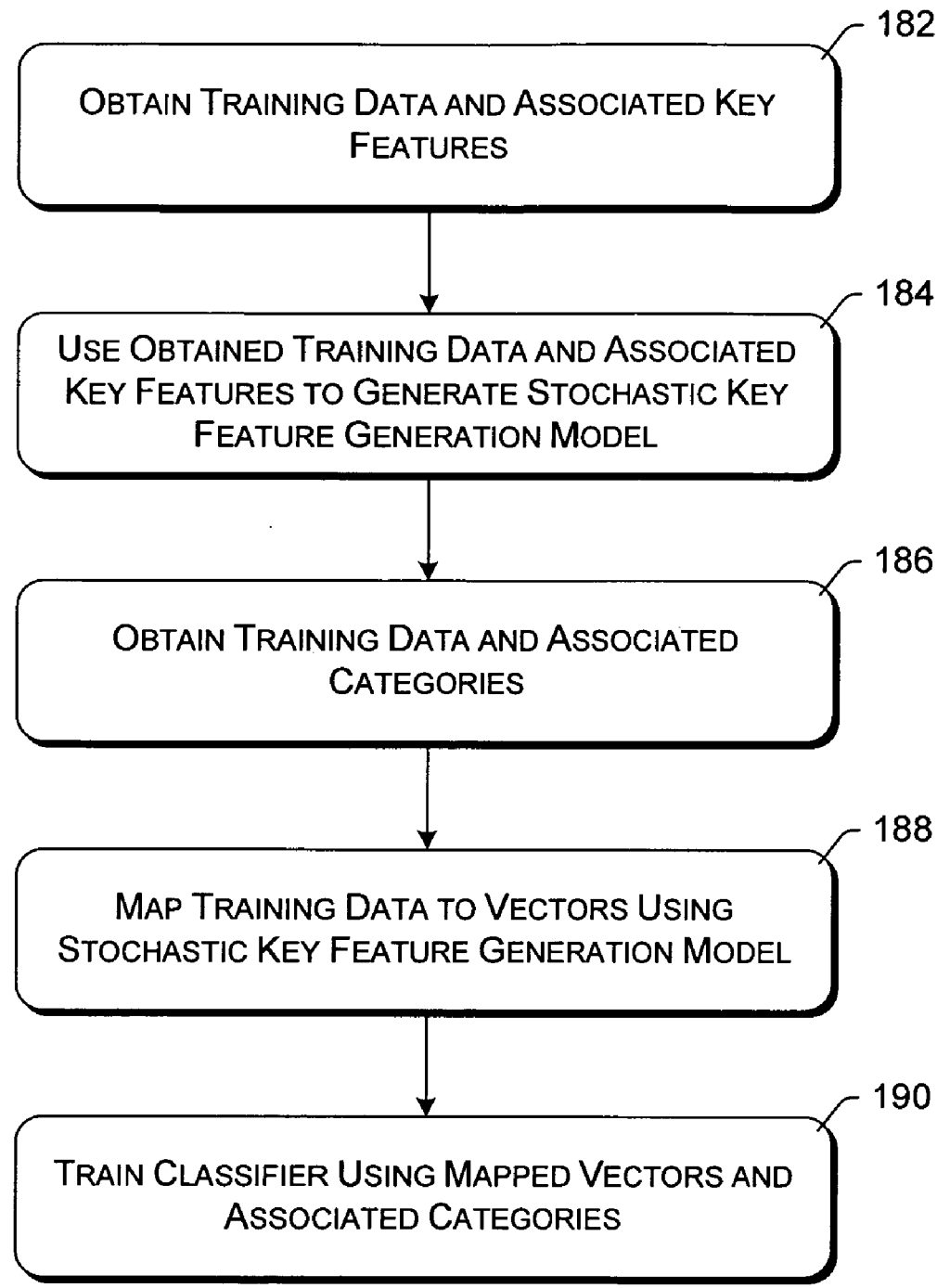
FIG. 3 is a flowchart illustrating an example process for training a classifier based on the stochastic key feature generation model.

TABLE I (Let $w_y^{(S)}$ denote $(w_{y,1}^{(S)}, w_{y,2}^{(S)}, \ldots, w_{y,m}^{(S)})$)
Select a confidence threshold τ and a learning speed η
for ( y ∈ γ ) $w_y^{(S)}$ (0) ← 0, $b_y$(0) ← 0
t ← 0, R = max‖θ($x_i$)‖
    $x_i$
repeat
    for i = 1,2, . . . ,l
        for y ∈ γ
            if y = $y_i$ then z ← 1
                else z ← −1
            if z(θ($x_i$)·$w_y^{(S)}$ (t) + $b_y$ (t)) ≤ τ then
                $w_y^{(S)}$ (t + 1) ← $w_y^{(S)}$ (t) + ηzθ($x_i$)
                $b_{l+1}$ ← $b_{l+1}$ + ηz$R^2$
                t ← t + 1
            end if
        end for
    end for
until no updates made within the for loop FIG. 3 is a flowchart illustrating an example process 180 for training a classifier based on the stochastic key feature generation model. The process of FIG. 3 is performed, for example, by training module 102 of FIGS. 1 and 2, and may be implemented, for example, in software, firmware, hardware, or combinations thereof.

Initially, training data and associated key features are obtained (act 182). The training data and associated key features can be different types, as discussed above, such as pieces of text and keywords associated with those pieces.

The obtained training data and associated key features are used to generate a stochastic key feature generation model (act 184). As discussed above, the stochastic key feature generation model denotes the space of conditional probability values in key features.

Training data and associated categories (or classes) are then obtained (act 186). The training data in act 186 may be the same (or partially the same) as the training data in act 182, or alternatively may be different. The training data obtained in act 186 is then mapped to vectors using the stochastic key feature generation model generated in act 184 (act 188). The resultant vectors are thus also associated with the categories obtained in act 186.

A classifier is then trained using the mapped vectors from act 188 and the categories associated with those vectors from act 186 (act 190). The resultant trained classifier from act 190 can then be used to classify or categorize data input to the classifier.

Figure 4:
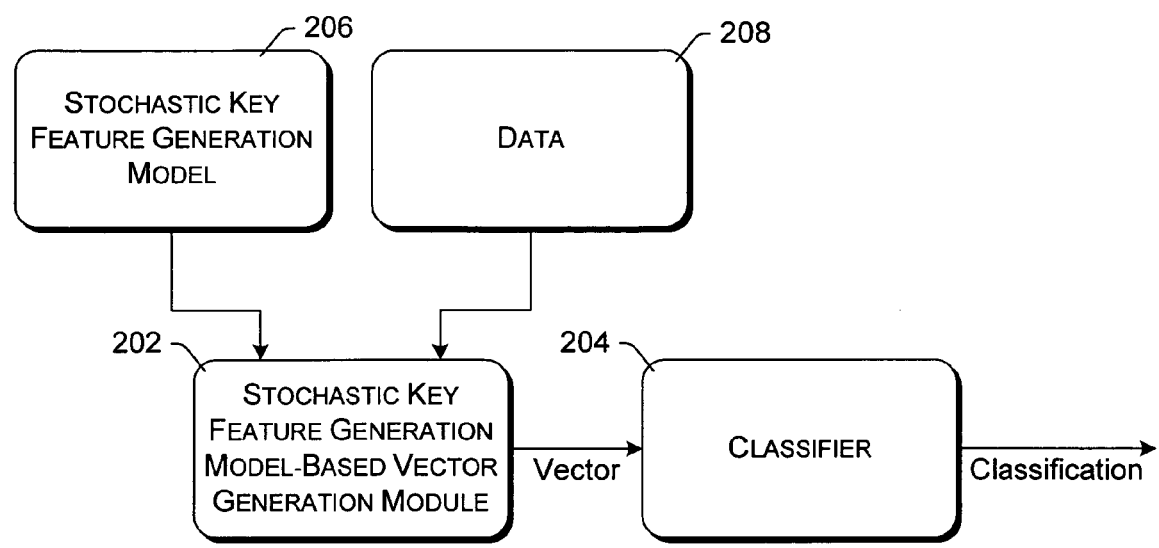
FIG. 4 illustrates an example of a system for classifying data based on the stochastic key feature generation model.

FIG. 4 illustrates an example of system 200 for classifying data based on the stochastic key feature generation model. System 200 includes a stochastic key feature generation model-based vector generation module 202 and a classifier 204.

Stochastic key feature generation model-based vector generation module 202 receives as an input a stochastic key feature generation model 206 and data 208. The stochastic key feature generation model 206 is the model trained and output by stochastic key feature generation model training module 132 of FIG. 2. The data 208 is the data that is to be classified.

Stochastic key feature generation model-based vector generation module 202 uses the trained stochastic key feature generation model θ to map data 208 into a vector. Module 202 operates in the same manner as training data mapping module 134, except that module 202 is operating on data to be classified rather than training data. This maps the data 208 to a vector θ(x) of the stochastic keyword generation model.

The vector generated by module 202 is then input to classifier 204. Classifier 204 is the trained classifier output by classifier training module 136 of FIG. 2. Classifier 204 uses the vector received from module 202 to classify the data 208 into one or more classes or categories.

It should be noted that system 200 does not require summaries for data 208 in order for data 208 to be classified. If a summary for data 208 exists, then the summary can optionally be included as part of the data input to module 202, or alternatively the summary can be ignored by module 202.

Figure 5:
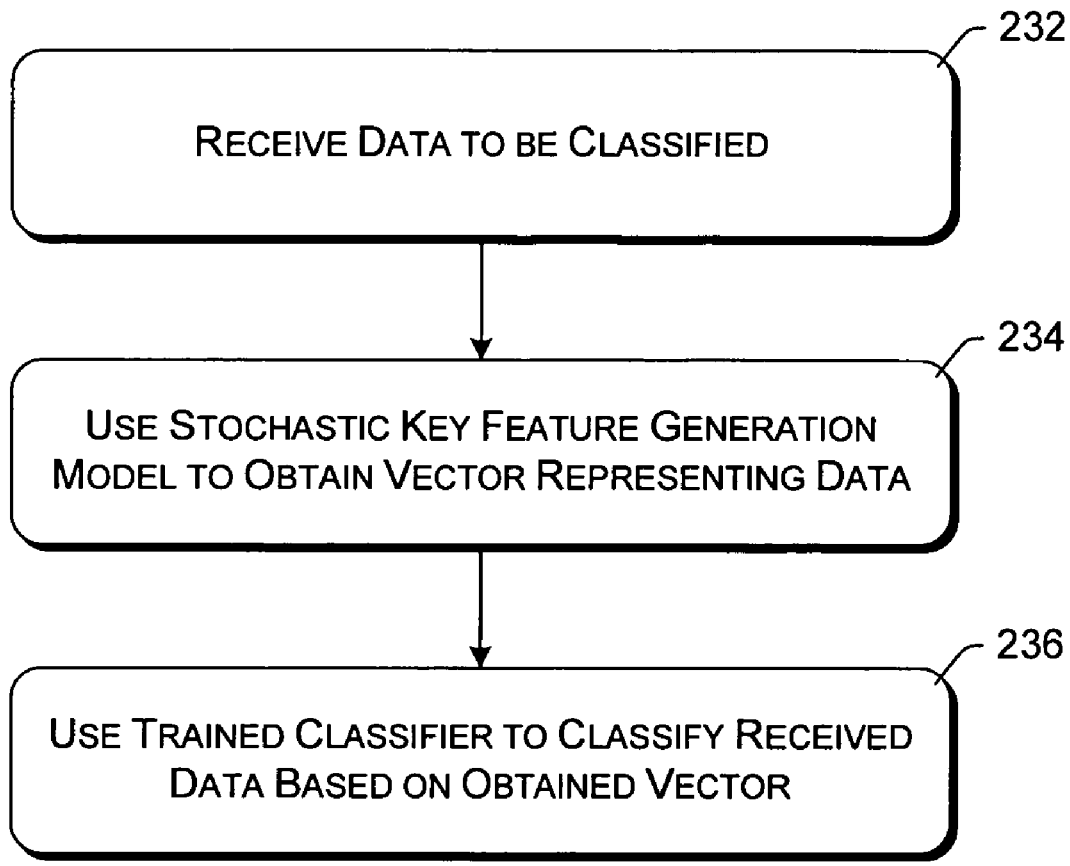
FIG. 5 is a flowchart illustrating an example process for classifying data based on the stochastic key feature generation model

FIG. 5 is a flowchart illustrating an example process 230 for classifying data based on the stochastic key feature generation model. The process of FIG. 5 is performed, for example, by system 200 of FIG. 4, and may be implemented, for example, in software, firmware, hardware, or combinations thereof.

The data to be classified is received (act 232), and the stochastic key feature generation model is used to obtain a vector representing the data (act 234). Once the vector is obtained, the trained classifier is used to obtain a classification or category or class for the vector (act 236). As the vector is based on the received data, this classification or category or class obtained in act 236 is also the classification or category or class for the data.

Figure 6:
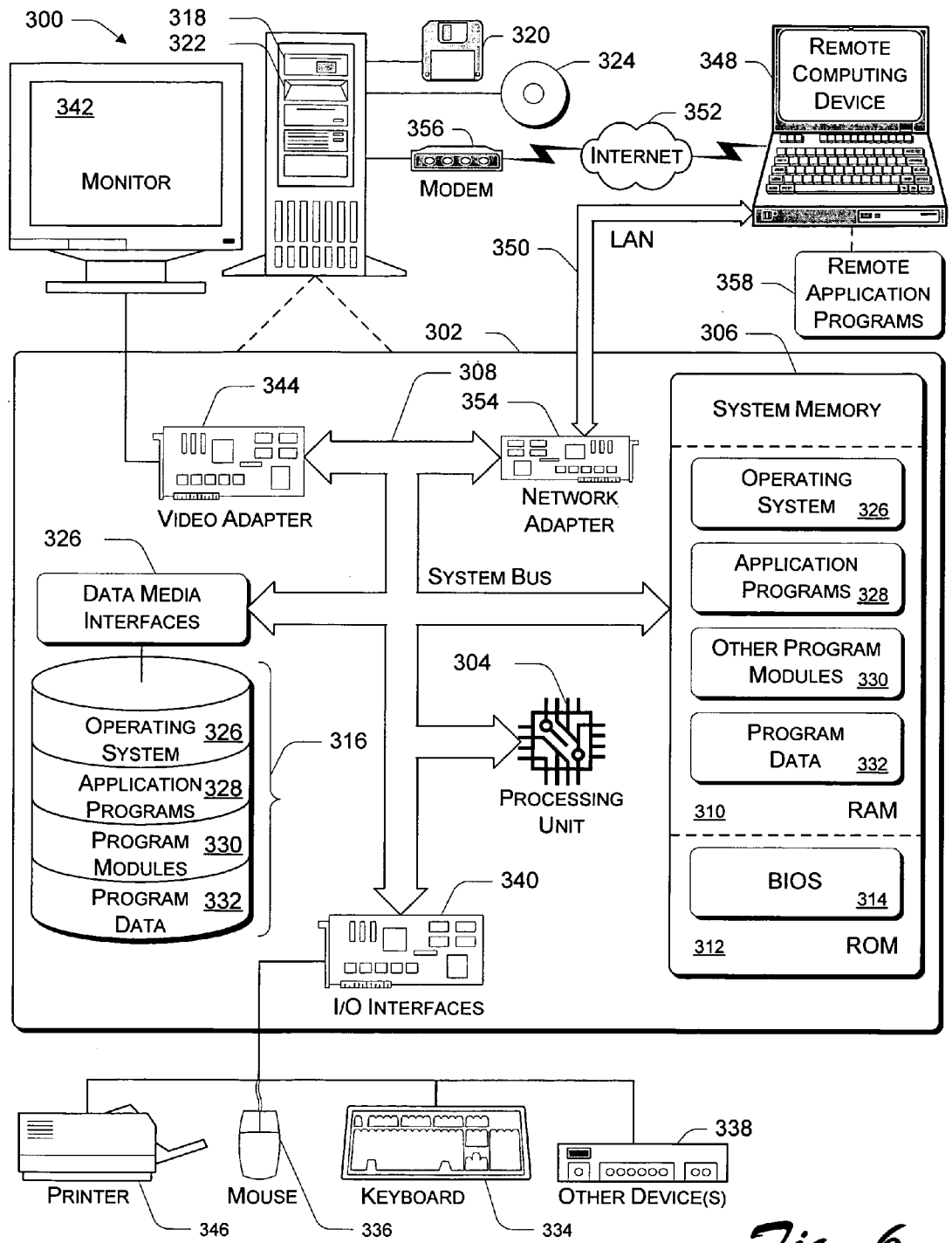
FIG. 6 illustrates an example of a general computer environment which can be used to implement the techniques described herein.

FIG. 6 illustrates an example of a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the example computer environment 300.

Computer environment 300 includes a general-purpose computing device in the form of a computer 302. Computer 302 can implement, for example, training module 102 of FIG. 1 or 2, or system 200 of FIG. 4. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 6 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (hot shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are examples and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Various flowcharts are described herein and illustrated in the accompanying Figures. The ordering of acts in these flowcharts are examples only—these orderings can be changed so that the acts are performed in different orders and/or concurrently.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer implemented method comprising:
    obtaining a set of training data having associated summaries;
    using the set of training data and associated summaries to generate a key feature generation model;
    obtaining another set of training data having associated categories;
    mapping, using the key feature generation model, the other set of training data to a set of vectors; and
    training a data classifier based on the set of vectors and the associated categories; and classifying data using the trained data classifier.

2. A computer-implemented as recited in claim 1, wherein the classifying includes:
receiving the data to be classified;
using the key feature generation model to obtain a vector representing the data to be classified;
inputting the obtained vector to the trained data classifier; and
obtaining, from the trained data classifier, a category in which the data is classified, wherein the category is one of the associated categories.

3. A computer-implemented method as recited in claim 1, wherein the training data comprises a plurality of pieces of training text, wherein the associated summaries include keywords, and wherein at least one summary corresponds to each piece of training text.

4. A computer-implemented method as recited in claim 1, wherein the set of training data and the other set of training data comprise the same data.

5. A computer-implemented method as recited in claim 1, wherein using the set of training data and associated summaries to generate the key feature generation model comprises:
obtaining, from the associated summaries, a key feature listing; and
creating, for each key feature in the key feature listing, a key feature classifier which judges how likely it is for the key feature to occur in one of the associated summaries.

6. A computer-implemented method as recited in claim 5, wherein obtaining the key feature listing comprises including, in the key feature listing, each key feature that is present in at least one of the associated summaries.

7. A computer-implemented method as recited in claim 5, wherein the key feature classifier comprises a naïve Bayesian classifier.

8. A computer-implemented method as recited in claim 5, wherein the key feature classifier comprises a probabilistic model.

9. A computer-implemented method as recited in claim 5, wherein mapping the other set of training data to a set of vectors comprises:
generating a probability vector for each of a plurality of pieces of training data of the other set of training data, wherein each component of the probability vector for a piece of training data represents the conditional probability of a key feature of the key feature listing given the piece of training data; and
including each generated probability vector as a vector of the set of vectors.

10. A computer-implemented method as recited in claim 5, wherein mapping the other set of training data to a set of vectors comprises:
for each piece of training data, using the created key feature classifiers to generate the elements of a vector of the set of vectors.

11. A computer-implemented method as recited in claim 1, wherein mapping the other set of training data to a set of vectors comprises:
generating a probability vector for each of a plurality of pieces of training data of the other set of training data, wherein each component of the probability vector for a piece of training data represents the conditional probability of a key feature given the piece of training data; and
including each generated probability vector as a vector of the set of vectors.

12. A computer-implemented method as recited in claim 1, wherein the data classifier comprises a support vector machine classifier.

13. A computer-implemented method as recited in claim 1, wherein the data classifier comprises nearest neighbor classifier.

14. A computer-implemented method as recited in claim 1, wherein the data classifier comprises a neural network classifier.

15. A computer-implemented method as recited in claim 1, wherein the data classifier comprises a naïve Bayesian classifier.

16. A computer-implemented method as recited in claim 1, wherein the data classifier comprises a logistic regression classifier.

17. A computer-implemented method as recited in claim 1, wherein the data classifier comprises a rule-based classifier.

18. One or more computer readable media having stored thereon a plurality of instructions that, when executed by one or more processors of a device, causes the one or more processors to:
obtain a set of training text having associated summaries;
use the set of training text and associated summaries to generate a keyword generation model;
obtain another set of training text having associated categories;
map, using the keyword generation model, the other set of training text to a set of vectors; and
train a text classifier based on the set of vectors and the associated categories.

19. One or more computer readable media as recited in claim 18, wherein the instructions that cause the one or more processors to use the set of training text and associated summaries to generate the keyword generation model comprise instructions that cause the one or more processors to:
obtain, from the associated summaries, a keyword listing; and
create, for each keyword in the keyword listing, a keyword classifier which indicates how likely it is for the keyword to occur in one of the associated summaries.

20. One or more computer readable media as recited in claim 19, wherein the instructions that cause the one or more processors to map the other set of training text to a set of vectors comprise instructions that cause the one or more processors to:
generate a probability vector for each of a plurality of pieces of training text of the other set of training data, wherein each component of the probability vector for a piece of training text represents the conditional probability of a keyword of the keyword listing given the piece of training text; and
include each generated probability vector as a vector of the set of vectors.

21. A computer-implemented method of classifying data, the method comprising:
receiving data to be classified;
using a key feature generation model to obtain a vector representing the data, wherein the key feature generation model is based on a set of training data having associated summaries; and
inputting the obtained vector to a trained data classifier, wherein the trained data classifier was previously trained using the set of training data and associated summaries.

22. A computer-implemented method as recited in claim 21, wherein different pieces of training data are used as a basis for the key feature generation model and the trained data classifier.

23. A computer-implemented method as recited in claim 21, wherein the set of training data comprises a plurality of pieces of training text, wherein the associated summaries include keywords, and wherein at least one summary corresponds to each piece of training text.

24. A computer-implemented method as recited in claim 21, wherein the key feature generation model was previously generated by:
obtaining, from the associated summaries, a key feature listing; and
creating, for each key feature in the key feature listing, a key feature classifier which indicates how likely it is for the key feature to occur in one of the associated summaries.

25. One or more computer readable media having stored thereon a plurality of instructions that, when executed by one or more processors of a device, causes the one or more processors to:
train a text classifier using multiple pieces of training text a plurality of summaries wherein each of the plurality of summaries is associated with one of the multiple pieces of training text, and a plurality of categories wherein each of the plurality of categories is associated with one of the multiple pieces of training text; and
use the trained text classifier to classify input text without an associated summary.

26. One or more computer readable media as recited in claim 25, wherein the instructions that cause the one or more processors to train the text classifier cause the one or more processors to:
obtain, from the associated summaries, a keyword listing;
create, for each keyword in the keyword listing, a keyword classifier which indicates how likely it is for the keyword to occur in one of the associated summaries; and
use, the created classifiers as a key feature generation model.

27. One or more computer readable media as recited in claim 26, wherein the instructions that cause the one or more processors to obtain the keyword listing comprise instructions that cause the one or more processors to include, in the keyword listing, each keyword that is present in at least one of the associated summaries.

28. One or more computer readable media as recited in claim 26, wherein each of the created keyword classifiers comprises a probabilistic model.

29. One or more computer readable media as recited in claim 26, wherein the instructions that cause the one or more processors to train the text classifier further cause the one or more processors to:
generate a probability vector for each of a plurality of pieces of the multiple pieces of training text, wherein each component of the probability vector for a piece of training text represents the conditional probability of a keyword of the keyword listing given the piece of training text;
include each generated probability vector as a vector of a set of vectors; and
map another plurality of pieces of the multiple pieces of training text to the set of vectors.

30. A system comprising:
a stochastic key feature generation model training module to generate a trained model based on a first training set wherein the first training set includes training data and associated summaries;
a training data mapping module to generate a plurality of vectors based on the trained model and a second training set, wherein the second training set includes training data and associated categories; and
a classifier training module to construct a trained classifier based on the plurality of vectors and the second training set.

31. A system as recited in claim 30, further comprising:
a stochastic key feature generation model-based vector generation module to generate a vector based on input data and the trained model; and
wherein the trained classifier is to receive the vector and, based on the vector, classify the input data into one or more classes.

32. A system as recited in claim 30, wherein the training data included in the first training set and the training data included in the second training set are the same training data.

33. A system as recited in claim 30, wherein the training data included in the first training set comprises a plurality of pieces of training text, wherein the associated summaries include keywords, and wherein at least one summary corresponds to each piece of training text.

34. A system as recited in claim 30, wherein the stochastic key feature generation model training module is to generate the trained model by:
obtaining, from the associated summaries, a key feature listing; and
creating, for each key feature in the key feature listing, a key feature classifier which judges how likely it is for the key feature to occur in one of the associated summaries.

35. A system as recited in claim 34, wherein the stochastic key feature generation model training module is to obtain the key feature listing by including, in the key feature listing, each key feature that is present in at least one of the associated summaries.

36. A system as recited in claim 34, wherein the key feature classifier comprises a probabilistic model.

37. A system as recited in claim 34, wherein the training data mapping module is to generate the plurality of vectors by:
generating a probability vector for each of a plurality of pieces of training data in the second training set, wherein each component of the probability vector for a piece of training data represents the conditional probability of a key feature of the key feature listing given the piece of training data; and
including each generated probability vector as a vector of the plurality of vectors.

38. A system as recited in claim 34, wherein the training data mapping module is to generate the plurality of vectors by:
using, for each piece of training data, the created key feature classifiers to generate the elements of a vector of the plurality of vectors.

39. A system as recited in claim 30, wherein the training data mapping module is to generate the plurality of vectors by:
generating a probability vector for each of a plurality of pieces of training data included in the second training set, wherein each component of the probability vector for a piece of training data represents the conditional probability of a key feature given the piece of training data; and including each generated probability vector as a vector of the plurality of vectors.

40. A system comprising:
a stochastic key feature generation model-based vector generation module to generate a vector based on input data and a stochastic key feature generation model, wherein the stochastic key feature generation model was previously generated based on training data and associated summaries; and
a classifier to receive the vector and, based on the vector, classify the input data into one or more classes.

41. A system as recited in claim 40, wherein the training data comprises a plurality of pieces of training text, wherein the associated summaries include keywords, and wherein at least one summary corresponds to each piece of training text.

42. A system as recited in claim 40, wherein the stochastic key feature generation model was previously generated by:
obtaining, from the associated summaries, a key feature listing; and
creating, for each key feature in the key feature listing, a key feature classifier which indicates how likely it is for the key feature to occur in one of the. associated summaries.

43. A system comprising:
means for generating a trained model based on a first training set, wherein the first training set includes training data and associated summaries;
means for generating a plurality of vectors based on the trained model and a second training set) wherein the second training set includes training data and associated categories; and
means for constructing a trained classifier based on the plurality of vectors and the second training set.

44. A system as recited in claim 43, further comprising:
means for generating a vector based on input data and the trained model; and
wherein the trained classifier is to receive the vector and, based on the vector, classify the input data into one or more classes.

* * * * *